United States Patent [19]

Shave

[11] 4,138,657

[45] Feb. 6, 1979

[54] SHIPBOARD APPARATUS FOR MEASURING OCEAN CURRENTS

[75] Inventor: David G. Shave, Houston, Tex.

[73] Assignee: Western Geophysical Co. of America, Houston, Tex.

[21] Appl. No.: 844,995

[22] Filed: Oct. 25, 1977

[51] Int. Cl.$^2$ .............................................. G01S 9/66
[52] U.S. Cl. ..................................... 340/3 D; 73/189
[58] Field of Search .............. 340/3 D; 73/189, 194 A

[56] References Cited

U.S. PATENT DOCUMENTS

| | | | |
|---|---|---|---|
| 3,337,840 | 8/1967 | Turner | 340/3 D |
| 3,630,079 | 12/1971 | Hughes et al. | 73/178 R |
| 3,974,692 | 8/1976 | Hassler | 73/194 A |

Primary Examiner—Richard A. Farley
Attorney, Agent, or Firm—William A. Knox

[57] ABSTRACT

A survey ship proceeds along a desired track as determined by precision navigational aids. A doppler sonar is programmed to receive returns from various water masses circulating at various depths between the ship and the water bottom. The doppler sonar scans the different depths by changing the signal return-time window. The ship's track resolved with the water-current velocity components to obtain a resolved water current vector. The doppler sonar may be an integral part of the navigation system. In such a case, the doppler sonar will be commanded to lock on the water bottom at selected intervals to determine the true ship's track and at other intervals, the sonar will track one or more water masses. Alternatively, two sonar signal receivers may be used, one to continuously track the water bottom and one to scan the water masses at various depths.

14 Claims, 4 Drawing Figures

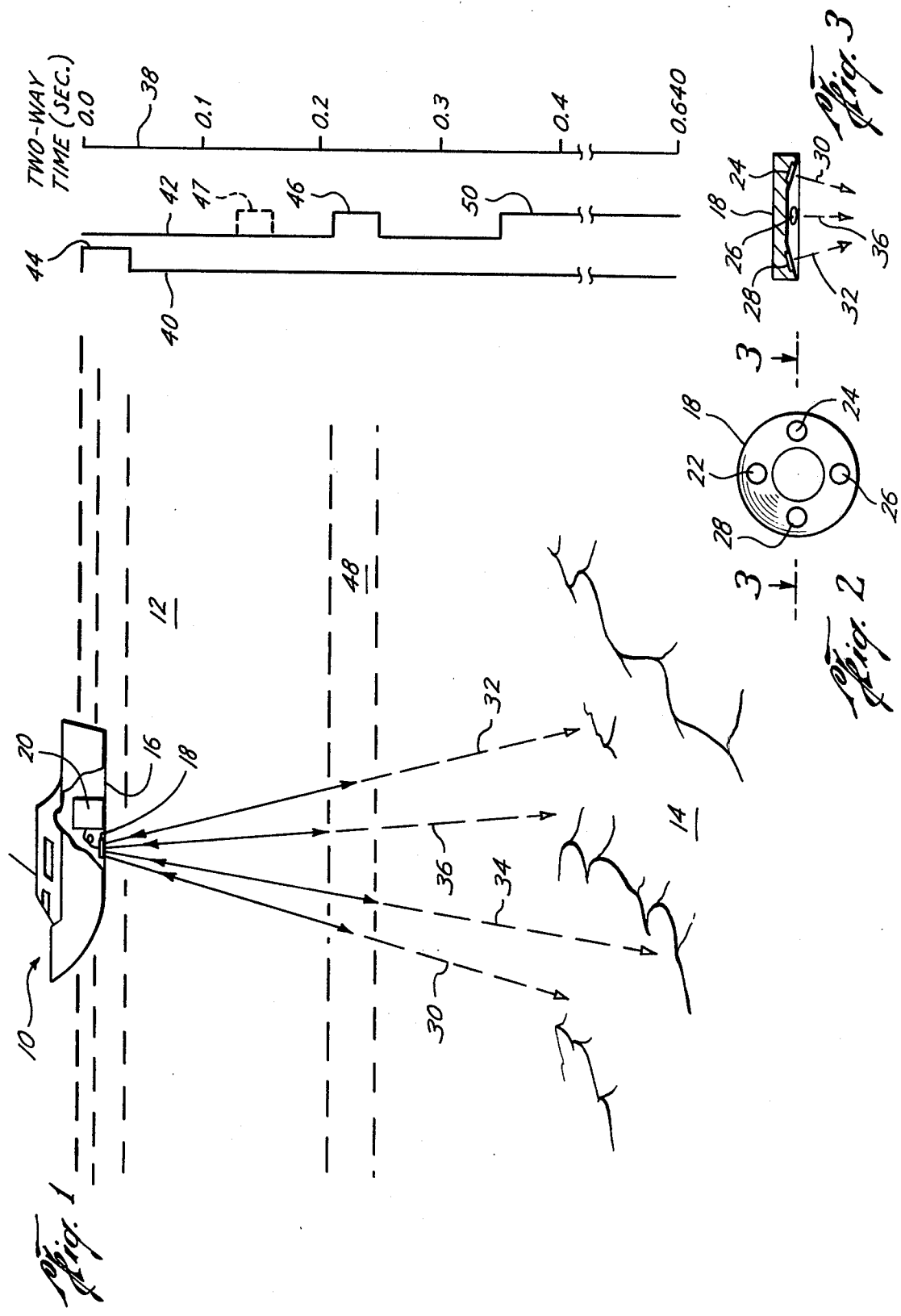

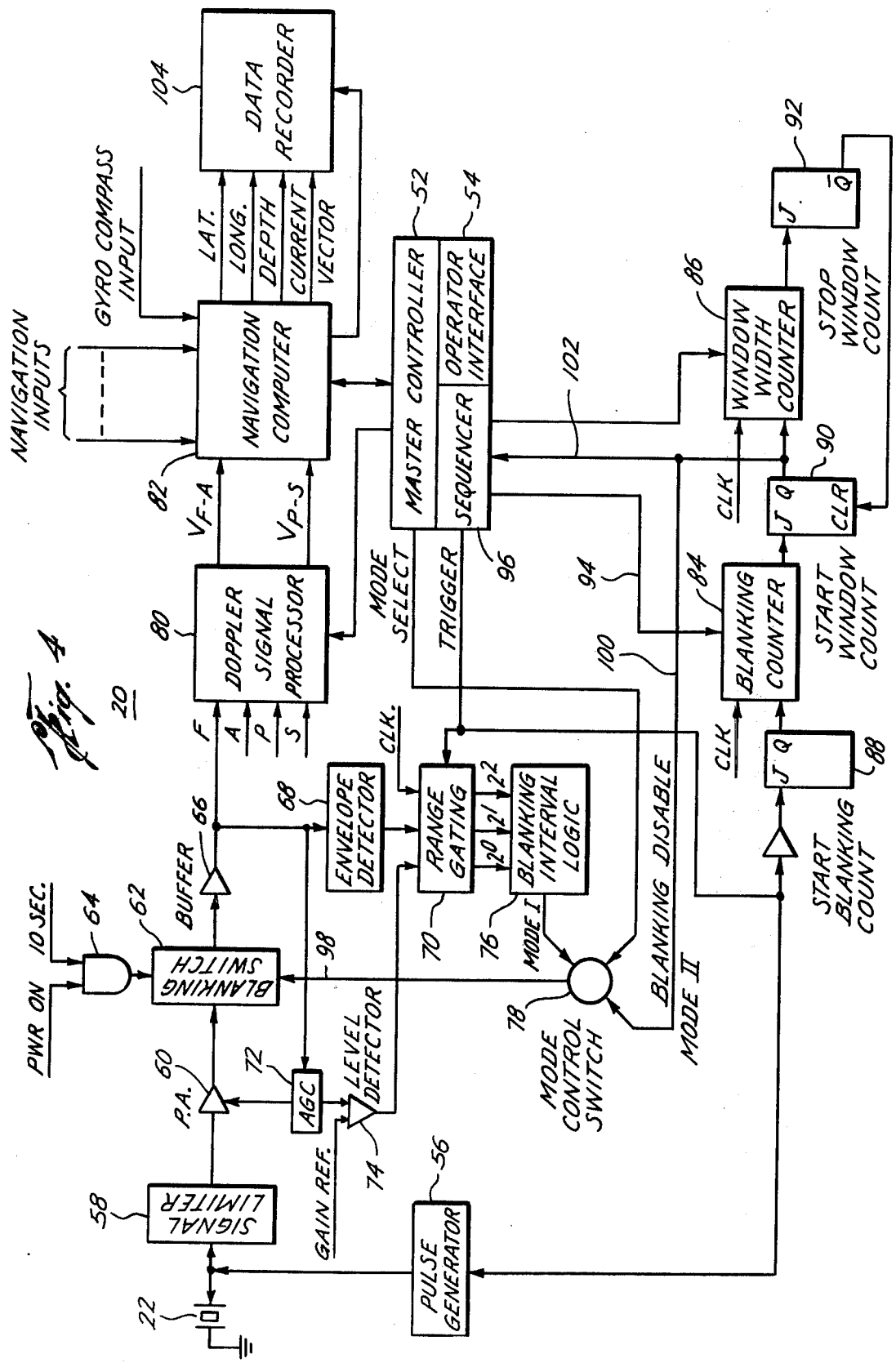

SHIPBOARD APPARATUS FOR MEASURING OCEAN CURRENTS

BACKGROUND OF THE INVENTION

1. Field of the Invention

This invention relates to the field of pulsed-doppler sonars and their application to navigation and oceanography.

2. Description of the Prior Art

The current vectors of deep water masses in a body of water such as the ocean are customarily measured by current meters. The meters are attached at various depths to the anchor cable of a taut-line buoy. To determine the currents over a wide area, a large number of such buoys are required. The necessary number and their spacing depends, of course, upon the degree of resolution desired. Since the buoys with their attached current meters are fixed in place, the arrangement is somewhat inflexible. Another method employing free-fall bouys is disclosed in U.S. Pat. No. 3,972,231.

Greater flexibility could be attached if the currents were measured from shipboard. The ship could easily and quickly cover a very wide area. Surface currents of course, are determined by noting the corrections necessary to hold a ship to a desired track and speed. The term "track" is defined as the actual course of the ship over the earth's surface as opposed to "heading" which defines the direction in which the bow of the ship is pointing. The track vector defines the direction and speed of the ship along the desired course. Because wind also affects the ship's heading, the heading correction is not necessarily a true measure of the surface currents.

Near-surface currents can be measured by noting the deflection of a long towed streamer, relative to the ship's track. One such system, designed for seismic exploration, is described in co-pending U.S. patent application Ser. No. 740,167 and now abandoned, assigned to the assignee of this invention. In the above system, a hydrophone streamer cable more than two miles long is towed behind the seismic ship. Embedded in the streamer cable, along with the hydrophones, are a number of sonar-like sensors. Two transmitters or pingers are mounted on outriggers on each side of the ship, along a base line. Using the difference in arrival times of the "pings" at each sensor, it is possible to compute by triangulation, the amount and direction of the streamer deflection. Streamer deflection can be translated into a current vector for near-surface currents.

Determination of deep ocean-current profiles is fraught with many difficulties. In fact, William VonArx devotes an entire chapter, chapter 8, to current-measurement problems in his book "An Introduction to Physical Oceanography", Library of Congress Catalog No. 61-5026. Accordingly an improvement in the art would be welcome to oceanographers.

Many geographical exploration ships now carry multisensor, integrated navigation systems. The many sensors provide redundancy such that if one sensor becomes inoperative, the other units will hold the ship to the desired track. Such systems may employ a pulsed doppler sonar, satellite receiver, inertial platform, and various radio navigation devices such as VLF, Loran C, Shoran, Decca etc. One such integrated system is disclosed in U.S. Pat. No. 3,630,079.

As is well known in navigational circles, a pulsed doppler sonar in combination with a high quality gyro compass, provides a very good means for determining the ship's track vector. But the above statement is true only provided the doppler sonar pulses are locked on the water bottom. If the pulses lock on a water mass at some depth, the indicated ship's track will be in error by the amount of the water-mass current vector. Heretofore, it was considered a nuisance when the doppler sonar locked on a water mass instead of on the water bottom. Every effort was made to avoid water-lock. In U.S. Pat. No. 3,437,987, the inventor went to the trouble of mounting the doppler sonar unit in a "fish" that was towed behind the ship at an altitude of one or two hundred feet above the sea floor to insure that the sonar would always track on the bottom rather than on a water mass.

It is an object of this invention to make use of the ability of the doppler sonar to lock onto a water mass and, using others of the sensors of the multisensor navigation system to maintain the desired ship's track, to determine the current vector of a water mass. As far as I am aware, productive use of the "nuisance" capability of the doppler sonar has not previously been suggested in the prior art.

U.S. Pat. Nos. 3,257,638, 3,491,333, and 3,617,995 are incorporated herein by reference as disclosing the operation of typical prior-art doppler sonar navigation systems.

SUMMARY OF THE INVENTION

It is the object of this invention to provide a profile of the water-current vectors below the surface of a body of water. The current vectors are measured by scanning the water at specified depths from the surface to the bottom using a pulsed doppler sonar having a two-axis transducer. The resulting data define the velocity components relative to the transducer axes and the ship's heading. Knowing the ship's track from other sources, the velocity components are resolved with the track to provide the desired water-current profile.

More particularly, a ship-mounted acoustic doppler sonar system is provided for emitting pulsed acoustic signals into a body of water. The emitted signals are directed towards the water bottom and are returned by reflection from discontinuities in the water as well as from the water bottom. The reflected signals are detected by a two axis transducer and are then processed as velocity components by suitable receiving circuitry. During a substantial portion of the time elapsed between signal emission and the reception of the bottom-reflected signals, a blanking interval is established to disable the receiving circuitry except when a bottom return is received.

In accordance with a preferred aspect of this invention, at least one, temporary, blanking-disable window is incorporated into the blanking interval. For the short period of time embraced by the blanking-disable window, the receiving circuitry is enabled, to allow processing of returns reflected from discontinuities in the water above the water bottom.

In accordance with one aspect of this invention, the beginning of the blanking-disable window occurs after a preselected time delay after signal emission, the time delay corresponding to a desired water depth.

In accordance with another aspect of this invention, the width of the blanking-disable window may be adjusted to include a desired volume of water.

In accordance with yet a further aspect of this invention, a plurality of blanking-disable windows each having a preselected width, may be incorporated within a single blanking interval.

In one embodiment of this invention, the water bottom returns are resolved about the true heading of the ship to define a track vector. The water returns, received and processed as velocity components during the span of the blanking disable window, are resolved about the ship's track vector by a navigation computer to determine the water current vectors. The water current vectors are recorded as a function of water depth and the ship's geographic coordinates to provide a current-vector profile.

In an alternate embodiment this invention, a scan cycle is defined. A scan cycle consists of a number of scan periods. During each scan period, the doppler sonar accomplishes at least two operating cycles of emitting a pulsed acoustic signal, receiving said signal after it has been returned by reflection from the water bottom or from a water mass, and processing the signal returns as velocity components. The velocity components from each operating cycle within the same scan period are averaged. The average of the velocity components is vectorially resolved with the ship's track, using the navigation computer to determine the water-current velocity vector for that scan period. For at least one scan period of each scan cycle, the sonar system tracks the water bottom to measure the ship's track vector. For additional scan periods within a scan cycle different time delays are applied to the blanking disable windows of the respective scan periods. The respective time delays correspond to the different water depths assigned for study. During each of the respective scan periods the doppler sonar tracks a different water mass to determine the velocity components at various depths. The respective velocity components are resolved with the known ship's track to provide current vectors for the various depths. The so-computed current vectors are recorded as a current profile on a suitable storage device as a function of the geographic coordinates of the ship averaged over the duration of the scan cycle.

In another embodiment of this invention, two doppler sonar transducers are used. One transducer maintains a continuous lock on the water bottom to provide an accurate measure of the ship's track vector. The other receiver then scans the water column at the desired depths.

BRIEF DESCRIPTION OF THE DRAWINGS

The foregoing and other objects and advantages of this invention will be better understood by reference to the appended detailed description and the drawings wherein FIG. 1 is a showing of the manner in which a boat-mounted doppler sonar maybe used to track a water mass or the water bottom;

FIG. 2 illustrates a bottom view of a doppler sonar transducer;

FIG. 3 is a cross section along line 3—3' of FIG. 2;

FIG. 4 is a block diagram of the control and blanking circuitry used to track water currents at selected depths.

DETAILED DESCRIPTION OF THE PREFERRED EMBODIMENT

In FIG. 1 is shown a ship 10, sailing over the surface of a body of water 12, overlying the water bottom 14. Installed in the hull 16 of ship 10 is a four-element, two-axis doppler sonar transducer 18. Transducer 18 is connected to signal processing circuitry that may be included as a part of a multisensor navigation system 20. Navigation system 20 may include in addition to the doppler sonar, a gyro compass, satellite receiver, Loran C and Omega receivers, an inertial guidance system etc., such as described in the afore-mentioned U.S. Pat. No. 3,630,079, but to avoid undue complexity of the drawing, these units are not shown in FIG. 1.

The operation of a doppler sonar is well known. Briefly, four piezoelectric crystals 22, 24, 26, 28 are mounted on a four-element two-axis transducer 18 (See FIGS. 1, 2, 3). The crystals are aimed at an angle of 30° from the vertical along the fore-aft, port-starbord ship axes. An operating cycle is established at intervals of about 600 ms (milliseconds). The crystals are triggered to emit a 40-ms long, 150-kHz pulsed acoustic signal. Radiating downwards in three-degree beams 30, 32, 34, 36, the pulsed signals impinge upon the water bottom 14. The beams are reflected from the bottom and return along the same paths back to transducer crystals 22-28 where the signals are detected. The so-detected signals are then amplified and processed by receiving circuitry as will be discussed later.

If the ship is moving with respect to the bottom, in accordance with Doppler's principle, the reflected pulse frequency is shifted to a value larger or smaller than the frequency of the original transmitted signal. The shift in frequency is proportional to the ship's velocity components relative to the bottom, referred to the two ship axes and to the transducer axes. Since the raw doppler shifts represent velocities referred to the ship axes, they are resolved with the ship's gyro-compass heading to derive velocities relative to geographic coordinates. The velocities are integrated to compute distance travelled.

Because the same crystals are used both to transmit and to receive on a time-share basis, the receiving circuitry must be disabled during signal-transmit time to avoid saturating the signal-receiving amplifiers. Doppler returns may be received from an intermediate water layer as well as from the water bottom. In conventional navigation practice, the signal receiving circuitry (to be discussed below) remains disabled or blanked for a substantial portion of the elasped time between emission of the pulsed acoustic signal and reception of the reflected signal returns, until a short time before the water-bottom return is expected. The receiving circuitry is blanked for most of the round trip travel time of the sonar pulses, so that the doppler sonar system will, in effect, "see" only the water bottom. It will not see an intermediate water layer, provided of course, that the water-bottom depth does not exceed the penetration capabilities of the system. In present-day systems, the depth limit for bottom tracking is about 1200 feet.

In a preferred mode of operation, the system of this invention departs from conventional practice by providing one or more blanking disable windows during the normal blanking cycle during which the sonar receivers may purposely track on one or more selected water layers or water masses. By applying different time delays, the windows may be set to appear at various times after a trigger pulse to track water layers at selected depths and their widths may be adjusted to track a greater or lesser thickness of a water layer.

Referring back now to FIG. 1 and, the right hand portion thereof, there is shown a two-way travel time scale 38 and signal timing diagrams 40, 42. The time scale is divided into 0.1 second intervals. One complete operating cycle is shown to be equal to 0.640 second, although the cycle time could be more or less than 0.640 second. Timing diagram 40 shows a trigger pulse 44, 40 ms long (0.40 second), at time T=0.0. Timing diagram 42 represents the blanking cycle. The receiver circuitry is blanked from T=0.0 to T=0.350 second. The receivers are then enabled (blanking is disabled) for 40 ms from T=0.210 to T=0.250 by blanking-disable window 46. For the remainder of the operating cycle of course, between T=0.250 and T=0.350, the receivers are again blanked.

Time T=0.210 represents a time delay that corresponds to the approximate depth of the top of water layer 48. With the receivers enabled, the doppler sonar can track water layer 48 as shown by the solid portions of beams 30-36. If a shallower or deeper water layer is to be tracked, the window 46 would be moved up or down the time scale by changing the time delay.

At T=0.350, the receivers are enabled for the remainder of the operating cycle to permit the doppler sonar system to track the water bottom at a time of about 0.400 second or about 850 feet. From FIG. 1, it may be appreciated that the receiving and processing circuitry are blanked for a substantial portion of the operating cycle.

The strength of the return signals from a selected water mass depends, among other things upon the density contrast between two adjacent water masses due to "volume reverberation". For this reason, window 46 is adjustable in width to allow the sonar beams 30-36 to include a greater or lesser water volume and to allow for fluctuations in depth to the selected water layer.

Referring now to FIG. 4, there is shown in block diagram form, the essentials of the doppler sonar portion of navigation system 20. At the upper left corner is shown a representative piezoelectric crystal such 22, mounted on transducer 18. The other three crystals are not shown to avoid unnecessary duplication.

The system is controlled by master controller 52 which may be a computer of any well known type having an operator interface 54 for entry of desired system parameters such as scan-cycle time, operating-cycle time, window blanking time count, blanking window width etc.

In the transmit mode, master controller 52 sends a trigger pulse to pulse generator 56 which sends a pulse to transducer crystal 22. A signal limiter 58 prevents the transmitted pulse from saturating and damaging gain-controlled receiving preamplifier 60.

In the prior-art systems, range-controlled automatic blanking is employed to eliminate noise and undesired returns from water layers between the water surface and the water bottom. Blanking is accomplished by opening blanking switch 62, thereby inhibiting return signals from entering the receiving circuitry downstream from the switch.

Range-controlled automatic blanking is initialized when the system is first turned on (powered up) by closing switch 62 for ten seconds under the control of AND-gate 64 having PWRON and 10SEC signal inputs. At the same time mode control switch 78 is opened by master controller 52. During the ten-second period, doppler sonar returns from the forward transducer are received and amplified through buffer amplifier 66 and transmitted to envelope detector 68 where each analog signal return is converted to a pulse. The pulses are transmitted to range gating circuitry 70.

Since the strength of a returned signal depends on the density contrast of the reflecting medium, water returns are inherently weaker than bottom returns. Accordingly, an automatic gain control 72 controls the gain of preamplifier 60 in inverse proportion to signal strength. The strength of a water-bottom return, even at extreme range, typically exceeds the strength of water returns by from six to more than 20 dB. Therefore, if preamplifier 60 is set to high gain, water masses are being tracked. Conversely, low gain indicates arrival of a water bottom return. One input of a level detector 74 is connected to AGC circuit 72. The other input is connected to a voltage reference which may be preset to an arbitrary level in accordance with operating experience in a given area. In the high gain state of preamplifier 60, the AGC voltage is below the reference. When the AGC voltage exceeds the reference, a bottom return has been received and level detector sends a pulse to range gating circuit 70. Thus, when the system is turned on, a trigger pulse is transmitted to range gating circuit 70 which starts a clock (CLK) counter. Each time envelope detector sees a return, a signal is sent to range-gating circuit 70. When a return is received that exceeds the AGC gain reference, a level-detect signal is sent from level detector 74 to range-gating circuit 70. The simultaneous presence of a level-detect signal and a return signal stops the counter. The contents of the counter are converted to a three-bit binary encoded range code and the code is sent to blanking interval logic 76. The range code, of course represent the elapsed time or "range" between the trigger pulse and receipt of the bottom return.

Several preset blanking intervals are provided in blanking logic 76, each having a different length. For example, there might be eight such blanking intervals, each 80 ms long, to provide various-length intervals from 80 to 640 ms. The three-bit range code from range gating circuit 70 can be used to select any one of the eight intervals provided. The blanking interval logic is programmed to select the longest interval that is shorter than the time represented by the encoded range. For example, if the range is 350 ms, the 320 ms blanking interval will be selected. The length of the blanking interval is, therefore a substantial portion of the elapsed time between emission of a pulsed acoustic signal and reception of the bottom return signal.

Range gating circuit 70 includes a shift register having the capacity to remember the ranges observed during several previous operating cycles. When the register is full, as each new range is entered, the oldest range is shifted out. A running average of the ranges is maintained on a continuous basis. As the range increases or decreases, blanking interval logic 76 adjusts the blanking interval accordingly.

At the end of ten seconds, when initialization is complete, the signal "10SEC" is turned off so that AND-gate 64 opens switch 62 which is now controlled solely by blanking interval logic 76 through mode control switch 78 which, at the end of the 10-second initialization period is set to Mode I by master controller 52. Once blanking interval logic 76 has been initialized, it remembers previous ranges. Accordingly it closes blanking switch 62 at a time, after triggering, shortly ahead of the expected bottom-return arrival time. As the operation continues, envelope detector 68 continually receives data to update the range gating circuit 70 and blanking interval logic 76.

It is to be understood in FIG. 4 that each of the transducers 22-28 forms a separate, time-shared transmit/receive channel. Each channel has its own gain-controlled preamplifier, blanking switch and buffer amplifier. Although only the forward-pointing channel is connected to the range-controlled blanking circuitry previously described, the blanking signal itself is applied to all channels in parallel.

During a typical operating cycle, after initialization, the transducers 22-28 are triggered during a transmit cycle to radiate a 40 ms, 150 kHz pulse as previously described. At the end of the blanking interval, the blanking switches in each channel are closed permitting signals received during a receiving cycle, to be amplified and transmitted to doppler signal processor 80. In processor 80, the doppler frequency shifts relative to the bottom are converted to pulse trains representative of $V_{f-a}$ (fore-and-aft velocity component) and $V_{p-s}$ (port-starbord velocity component). A typical scale factor is 50 pulses per second per knot. The velocity components relative to the ship axes are resolved around the ship's gyro-compass heading in navigation computer 82 to provide the true velocity relative to geographic coordinates. The thus-resolved velocities are integrated to provide distance and direction travelled and maybe incorporated with data from other navigation sensors by well known means.

The above described features of a conventional navigational doppler sonar system are well known to the art and per se form no part of this invention. They have been outlined in considerable detail however, to provide a better understanding of the referred method of operation of this invention.

Referring again to FIG. 4, there are shown a blanking counter 84, a window width counter 86, flip-flops 88, 90, 92, as well as previously-mentioned mode control switch 78.

As it will be remembered, in the "normal" operational mode, Mode I, the receiving circuitry is disabled by blanking switch 62 until just before the bottom return is expected. In order to purposely track on a water mass at a selected water depth, a blanking disable window (46, FIG. 1) must be established. Prior to triggering the system, blanking counter 84 is loaded with a number count equivalent to the travel time of a pulse propagating from the transducer assembly 18 to the top of the water mass. The blanking count is loaded over line 94 from sequencer 96 which is part of master controller 52. The blanking count is, of course, entered into the system from the operator interface 54. Blanking counter 84 is provided with a 100-Hz clock input CLK.

To track a water mass, master controller 52 sends a MODE SELECT signal to mode select switch 78, setting the system to Mode II. In Mode II, blanking switch 62 is under the control of blanking counter 84 rather than under control of the range-controlled blanking circuitry previously described. It is to be understood however that the range-control circuits are not disabled; they simply are temporarily disconnected from the blanking control line. At the beginning of an operating cycle, Mode select switch 78 is set to Mode II and a trigger pulse is transmitted to pulse generator 56, to range gating circuit 70 and to start-blanking-count flip-flop 88. When blanking counter 84 receives a signal from the Q output of flip-flop 88, it counts down the 100 Hz clock pulses from CLK until the count is exhausted. The total count-down time is the time delay applied to the blanking-disable window, equivalent to the water depth of the water mass assigned for study. At the zeroth count, a pulse to the J input of start-window-count flip-flop 90, generates a signal at the Q output to start window width counter 86. At the same time a blanking disable signal through line 100 closes blanking switch 62 to allow and receiving and processing circuitry to receive signals from a water mass. Window width counter 86 was previously loaded with a desired count. Window width counter 86 now starts counting down the 100 Hz clock pulses entering the counter via the CLK input. At the zeroth count, the Q output of stop-window-count flip-flop 92 transmit a clear term to flip-flop 90. when flip-flop 90 is cleared, the previously-resident signal level on blanking disable line 100 is cleared and blanking switch 62 is again opened to disable the downstream receiving circuitry. When blanking disable line 100 is cleared, a clear signal is also sent to sequencer 96 over line 102 and to master controller 52. Upon receipt of a clear signal, master controller 52 sets Mode select switch 78 to Mode I, now placing the system under control of the normal range-controlled blanking circuitry. It should be remembered that the temporary receipt of water mass returns does not affect normal operation of circuits 68, 70 and 76 because preamplifier 60 is necessarily set to high gain. Accordingly the system will be unblanked in time to receive the water bottom returns.

Although the system has been described in terms of use of a single blanking disable window to track one water layer, it will be clear to those skilled in the art, that sequencer 96 in conjunction with master controller 52 could easily be programmed to establish two or more blanking disable windows within the blanking interval during a given operating cycle, to track additional water layers such as at the dashed pulse 47, FIG. 1.

The ship's track over the earth is known from data provided by the navigation sensors of the multisensor navigation system 20 as well as from doppler sonar data gathered when the system is set to the bottom tracking mode. When the system is in Mode II, tracking a selected water layer, the apparent velocity components represent velocity components relative to the ship's axes. Accordingly when the system is in Mode II, master controller 52 directs navigation computer 82 to vectorially resolve $V_{f-a}$ and $V_{p-s}$ around the ship's track instead of around the gyro-compass heading by use of well known trigonometric algorithms. The velocity components of the current in the respective water layers are thereby converted to current vectors. The current vectors from the one or more water layers are then recorded as a function of latitude, longitude, and depth on a recording medium such as a magnetic data recorder 104, to provide a current profile vs. depth and ship's position.

As described above, the preferred embodiment of this invention provides a means for tracking one or more water layers or masses as well as the water bottom within a single operating cycle. In another type of operation, the system is programmed to track one selected water layer for a first series of operating cycles comprising a first scan period, on a second water layer for a second series of operating cycles, for a second scan period etc., and finally the water bottom is tracked for a final series of operating cycles. The velocity components from a series of operating cycles within a given scan period are then averaged. The scan periods from the first to the final period are collectively termed a scan cycle.

To implement the alternate type of operation for example, a two-minute scan cycle is preferably established by sequencer 96. The two-minute scan cycle is divided into six, 20-second scan periods. Assuming a 640 ms operating cycle, there will be about 31 operating cycles per scan period. During each of five scan periods in Mode II, sequencer 96 will load a different blanking count or time delay and window width into counters 84 and 86, thereby to track five different water layers. During the sixth scan period, the sequencer and master controller will cause the system to revert to Mode I to track the water bottom. The average values of the current vectors from the five levels then form a current profile corresponding to the average geographical position of the ship during the two-minute scan cycle. Velocity information from the scan period when the system is tracking the bottom in Mode I may be entered as a navigation parameter.

It is to be understood of course, that the above numerical example is exemplary only. Each water-depth level could be examined for longer or shorter intervals; the operating cycle duration could be changed in proportion to the water depth as could also the scan-cycle length. Of course, the spatial resolution of the current measurements in Mode II will be dependent upon boat velocity. At one knot, the boat will travel 200 feet during one, two-minute scan cycle and the current profile will be spatially averaged out over that distance. Thus, a higher boat velocity (a longer spatial average) can be tolerated in the presence of steady currents than in the presence of irregular, unpredictable eddy currents.

Little has been said about navigation computer 82. One such suitable computer complex is described in U.S. Pat. No. 3,630,079. This computer accepts all of the navigation data from many sensors to obtain the best statistical average of the ship's position and track over the earth's surface. The redundancy furnished by many navigation sensors, permits the ship to navigate accurately along the desired track when the doppler sonar system component is tracking water masses.

Although shown as separate items, sequencer 96, and master controller 52 may be a part of the navigation computer 82. The operator interface 54 is provided for entering system input parameters. Any well known means may be used such as thumbwheels, punched paper tape, magnetic tape or punched cards.

Scan cycle sequencer 96 determines the length of the scan cycle, the number of scan periods within a scan cycle, the number of operating cycles per scan period, the water depth assignments for each respective scan period, the blanking window width etc. All of these parameters are preset by the operator into operator interface 66.

A single doppler sonar transducer 18 has been assumed throughout this disclosure. In critical areas, it may be preferable to have two such transducers. One transducer is used to transmit and to receive water bottom return continuously, for use with the navigation system. The other transducer is used in the receive mode only and may be used for scanning the water current profile. Such a dual system would, of course require a duplication of the signal receiving circuitry but not necessarily the transmit circuitry.

The invention has been described in terms of certain specific embodiments, but it is to be understood that further modifications may be suggested by those skilled in the art and it is intended to cover such modifications as are within the scope of the appended claims. For example, master controller 52 and sequencer 96 could be hard-wired, dedicated electronic modules instead of a part of the navigation computer. A separate microprocessor could be substituted. The automatic range-controlled blanking interval circuitry could be replaced by or over-ridden by operator-selected blanking-interval electronics of any well known type.

I claim as my invention:

1. In a multiple-sensor navigation system mounted on a ship for determining the ship's track over or through a body of water, said navigation system including a navigation computer interconnected with said sensors, at least two of the sensors being a device to measure the ship's true heading and a pulsed doppler sonar set which includes as some of its components a two-axis transducer for directing a pulsed acoustic signal towards a water bottom and for receiving signal returns reflected from both water-mass discontinuities in said body of water and from the water bottom, signal receiving and processing circuitry interconnected with said transducer for resolving said received signal returns into velocity components, means for establishing a blanking interval to disable the receiving and processing circuitry for a substantial portion of the time elapsed between emission of said pulsed acoustic signal and reception of signal returns reflected from said water bottom, the improvement comprising:
   means for providing at least one time window, having an adjustable width, during said blanking interval during which said receiving and processing circuitry is enabled to track, receive, and process water returns and to convert said processed water returns into water-current velocity components; and
   means for adjusting the width of said time window.

2. The improvement as defined in claim 1 wherein the time of occurence of said time window within said blanking interval, relative to the emission-time of said pulsed acoustic signal, defines the depth of a selected water mass and the width of said time window defines the volume of water tracked.

3. The improvement as defined in claim 1 including:
   means for receiving and processing water-bottom returns at the end of the blanking interval;
   means in said navigation computer for vectorially resolving the processed water bottom returns with a measured heading to define the ship's track; and
   means in said navigation computer for vectorially resolving said water-current velocity components with the ship's track to define the water-current vector of said selected water mass.

4. The improvement as defined in claim 2 including;
   means for providing a plurality of separate, adjustable-width blanking-disable windows during said blanking interval so that said receiving and processing circuitry is periodically temporarily enabled to track, receive, and process water mass returns from a plurality of different water depths and to convert said processed returns from the respective depths into water current velocity components;
   means for individually adjusting the widths of the respective blanking-disable windows;
   means in said navigation computer for vectorially resolving said velocity components with the ship's track as determined by the multiple navigation sensors, to a water-current-vector profile; and means for recording said water-current-vector profile as a function of the ship's position.

5. The improvement as defined by claim 3 including: means for recording said current vector as a function of ship's position.

6. An apparatus mounted on a ship, travelling over a body of water, for determining a vertical current vector profile within said body of water, the apparatus including a multisensor navigation system including a navigation computer for continuously determining the ship's track, and a pulsed doppler sonar interconnected with said navigation system, said doppler sonar including at least one two-axis transducer for emitting a pulsed acoustic signal during a transmit cycle and for receiving during a receiving cycle, signal returns reflected from discontinuities in said body of water and from the water bottom on a time shared schedule during an operating cycle whose length in time is at least as long as the elapsed signal travel time between signal transmission and signal reception, the doppler sonar further including signal processing circuitry interconnected with said navigation system and with said transducer for resolving received signal returns into velocity components relative to the transducer axis, the apparatus comprising:
means for defining a desired plurality of operating-time cycles;
means for disabling the receiving cycle of said transducer over a blanking interval embracing a substantial portion of each said operating-time cycle;
means for providing at least one variable-width blanking disable window after a selected time delay following said transmitting cycle so that said transducer and said signal processing circuitry are temporarily enabled to receiver signals returned from a water mass at a prescribed depth and to resolve said returns as water mass velocity components;
means in said navigation computer for vectorially resolving said velocity components with said ship's track to define a water mass current vector; and
means for varying the width of said blanking-disable window.

7. The apparatus as defined by claim 6 including: means for recording said water current vector as a function of water depth and ship's position.

8. The apparatus as defined by claim 6 including:
means for grouping said desired plurality of operating cycles into a subplurality of scan periods, each said scan period including at least two consecutive operating cycles, the subplurality of scan periods collectively defining a scan cycle;
means for changing the length of said blanking-window time delay to a different value for each scan period so that the time delay associated with the operating cycles within any one scan period is different from the time delays associated with the operating cycles of another scan period to allow resolution of velocity components from a different water depth during each respective scan cycle;
means in said computer for vectorially resolving the averaged velocity components, determined during the respective scan periods, with the ship's track averaged over the duration of a scan cycle to derive a water-current vector profile.

9. The apparatus as defined by claim 8 including: means for adjusting the blanking-disable window widths separately for each said scan period.

10. The apparatus as defined by claim 9 wherein only returns from the water bottom are received during at least one of said scan periods; and
said water-bottom returns are entered into the navigation computer as a navigation parameter.

11. The apparatus as defined by claim 9 including:
means for recording said vertical current-vector profile as a function of water depth and the average ship's position during said scan cycle, the respective water depths being defined by the time delays assigned to the respective scan periods of said scan cycle.

12. The apparatus as defined by claim 6 including:
two, two-axis transducers, one said transducer being programmed to transmit acoustic pulses and to receive signals returned only from the water bottom, the other transducer being programmed to receive signal returns from at least one water mass at selected depth defined by the delay time applied to the said blanking-disable window.

13. In a multiple-sensor navigation system mounted on a ship that is travelling over or through a body of water, the system including at least a gyro-compass for determining the ship's true heading, a pulsed doppler sonar system for measuring the ship's velocity components relative to the water bottom, and means for resolving the ship's true heading with the ship's velocity components to define the ship's position and track, the improvement comprising:
means for establishing a plurality of doppler sonar operating cycles;
means for causing said doppler sonar to track the water bottom during a first plurality of operating cycles to establish the ship's track;
means for causing said doppler sonar to track at least one water mass at a first desired water depth during a second subplurality of operating cycles to measure the water mass velocity components,
means for resolving said water mass velocity components with said ship's track to define the water-mass current vector at said desired water depth.

14. The improvement as defined by claim 13 including:
means for causing said doppler sonar to track water masses at several different desired water depths during corresponding subpluralities of operating cycles to measure the respective water-mass velocity components at said several different water depths;
means for resolving the water mass velocity components from said several different water depths with said ship's track to define several corresponding water current vectors; and
means for recording said several water current vectors as a function of ship's position as a water-current profile.

* * * * *